Dec. 21, 1954 F. D. THARBY 2,697,413
BREEDING CAGE FOR BIRDS
Filed April 25, 1952 4 Sheets-Sheet 1

Inventor
Frederick D. Tharby,
By
Attorney

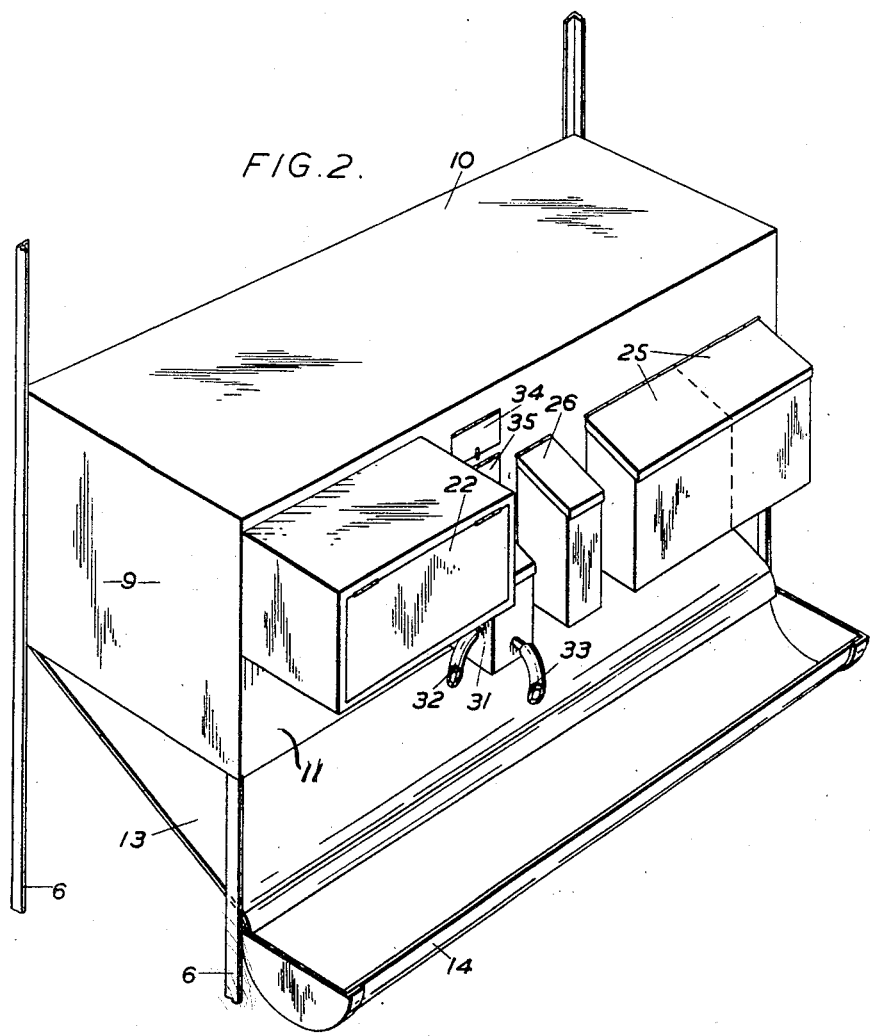

Dec. 21, 1954  F. D. THARBY  2,697,413
BREEDING CAGE FOR BIRDS
Filed April 25, 1952  4 Sheets-Sheet 3
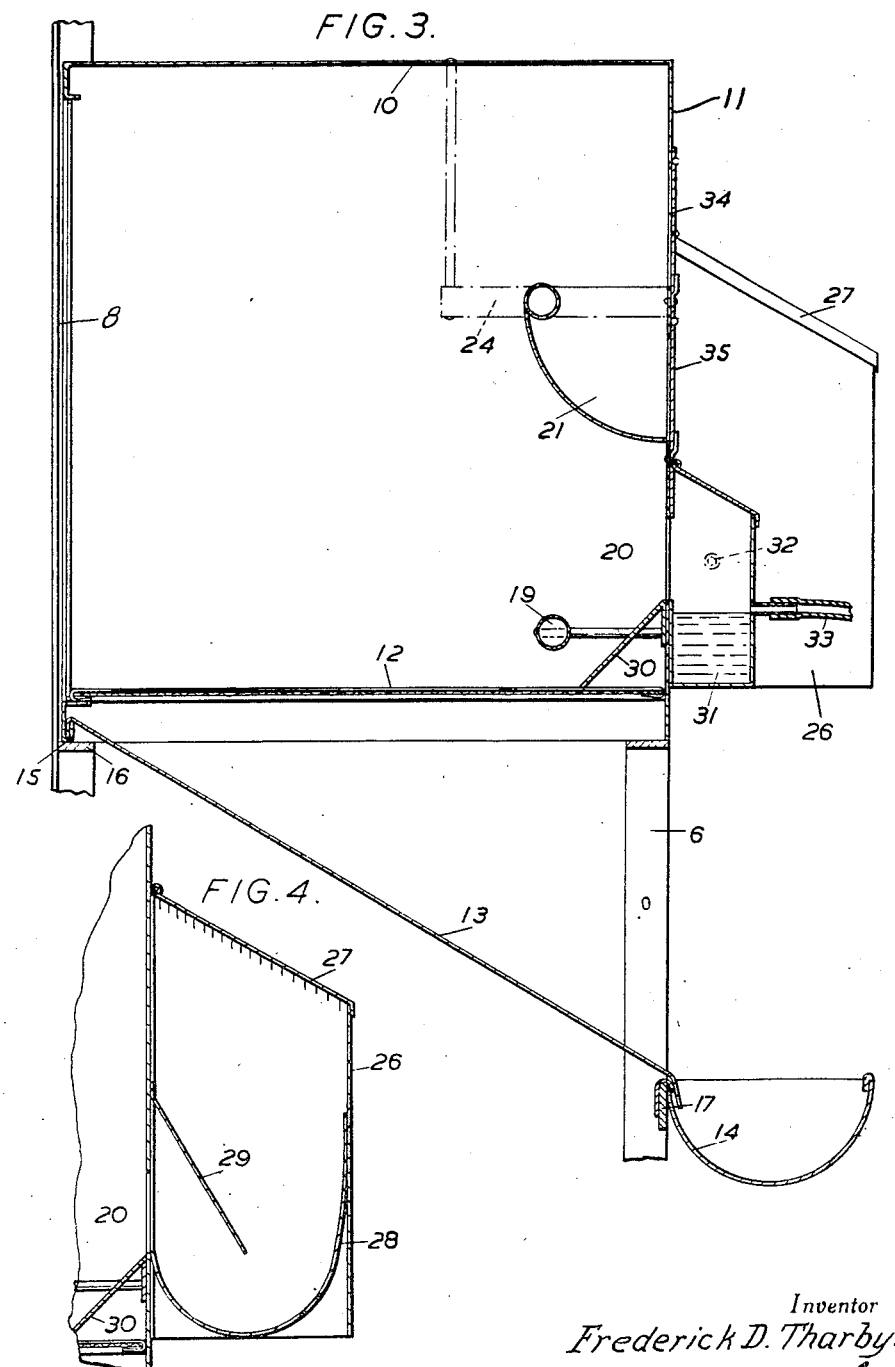
Inventor
Frederick D. Tharby.
By
Attorney Dec. 21, 1954 F. D. THARBY 2,697,413
BREEDING CAGE FOR BIRDS
Filed April 25, 1952 4 Sheets-Sheet 4

Inventor
Frederick D. Tharby,
By
Attorney

2,697,413

BREEDING CAGE FOR BIRDS

Frederick Douglas Tharby, Little Winters, Rocombe, Lyme Regis, England

Application April 25, 1952, Serial No. 284,232

3 Claims. (Cl. 119—17)

This invention has reference to improvements in and relating to breeders or cages for birds, hereinafter referred to as breeders.

The principal object of the present invention is the provision of a breeder wherein droppings and spilled food, or the major part thereof, do not accumulate immediately beneath the space occupied by the birds and can be readily removed from the vicinity of the breeder and wherein cleaning of such parts as may become fouled can be easily performed.

A further object of the invention is the provision of a breeder including food and water receptacles which are readily accessible for replenishing or cleaning purposes and cannot be occupied by the birds.

In accordance with the invention the floor of the breeder compartment to be occupied by the birds is of openwork form, wire netting or expanded metal of suitably small mesh, whilst beneath the floor of a sloping baffle or tray is arranged adapted to direct the droppings and spilled food and husks or the like to a receptacle located to be conveniently accessible. If desired two or more such baffles are arranged adapted to direct the droppings and the like to the receptacle.

The invention also comprises a breeder wherein the grit, food and water receptacles, or some of them, are located outside the compartment and are normally closed at the outside by cover flaps, whereas holes of a size insufficient to allow little more than the head of the bird to enter the receptacles are provided. A feeding perch is located within the compartment in the vicinity of the said holes. If desired a trough or tray for greenstuff may be located within the compartment, preferably near the top thereof, access to the trough for replenishment purposes being obtainable through an opening normally covered by a flap at the side or back of the breeder, and access for cleaning purposes being obtained through a lower flap in the said side or back. The dry foods, grit and water receptacles may be located near the floor of the breeder. The lip of the greenstuff trough or tray is preferably in the form of a perch.

Preferred embodiments of the breeder or cage according to the present invention are shown by way of example on the accompanying drawings in which:

Fig. 2 is a perspective view of Fig. 1 from the rear,

Fig. 3 is an enlarged cross sectional view of Fig. 1,

Fig. 4 is a detail view showing the arrangement of the food and water receptacles, and, Fig. 5 is a general perspective view of a modified form of the invention.

Figure 1:
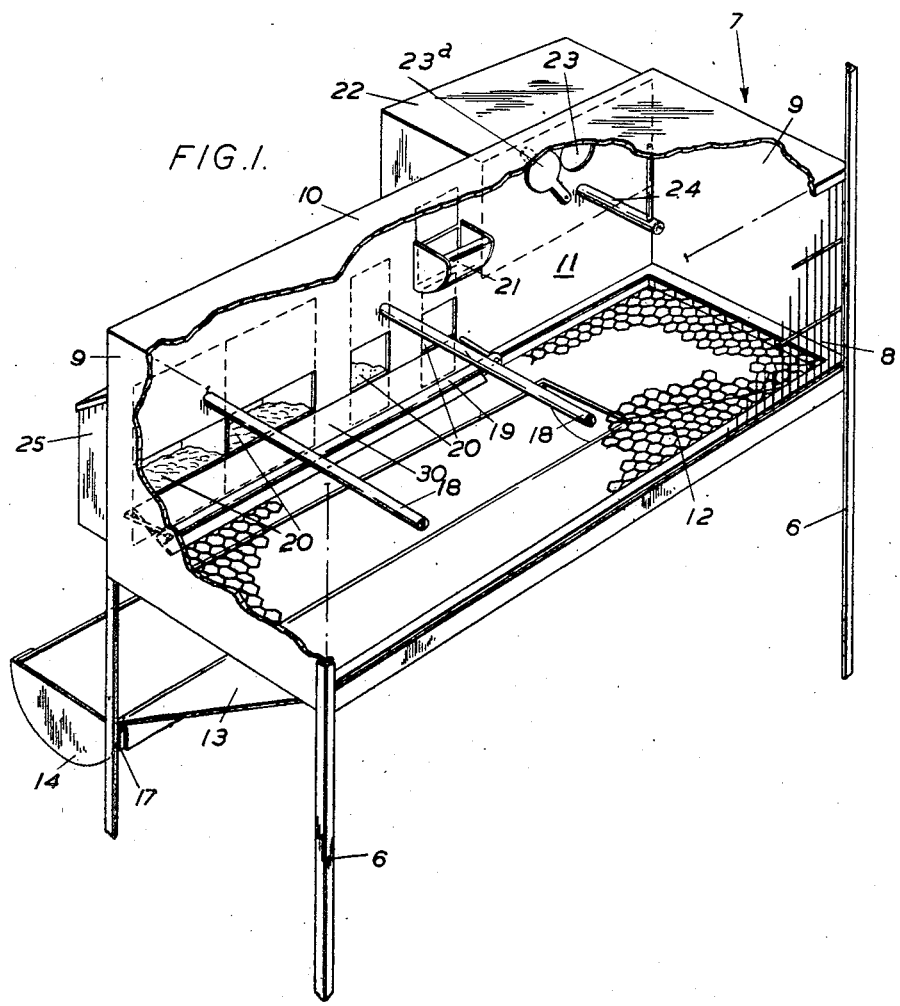
Fig. 1 is a perspective view of one embodiment according to the invention with parts of the cage cut away to show the internal arrangement.

The breeder or cage shown in Figs. 1 to 4 comprises angle metal or other frames 6 supporting the cage proper indicated generally at 7. The cage is provided with a wire openwork front 8 of the type usual in connection with breeders or cages and preferably with closed end walls 9, top member 10 and rear wall 11.

The base or floor of the cage is provided by a layer of fine wire mesh or expanded metal or other like material 12 which provides the base for the cage while permitting droppings and spilled grain and so on to fall through out of the space occupied by the birds.

A rearwardly and downwardly inclined baffle or tray 13 is provided extending completely beneath the cage floor 12 and the trough 14 is provided to collect the droppings, grain husks and so on falling on to the baffle or tray 13, whereby said droppings and so on can be readily collected and cleared away. Preferably the baffle or tray 13 is provided with clips or turned over parts adapted to rest at the front on a U-shaped support 15 resting on and secured to a supporting lug 16 attached to the framework 6. At its rear lower end the baffle or tray is bent at an angle and rests on a saddle bar 17 provided on the rear upright member of the framework 6. The same saddle bar 17 also carried an inverted U-shaped rear part of the trough 14 and preferably the baffle 13 rests over the U-shaped part of the trough. Thus the tray or baffle 13 may be readily removed for cleaning purposes and likewise the trough 14 can be dealt with in like manner.

The parts 8, 9, 10 and 11 of the cage are preferably formed of sheets of metal or other suitable material secured, for example by bolting, to the vertical members of the frame 6 and to cross members or stretchers extending between them. Preferably the floor 12 of the cage forms an independent unit removable from the cage in one piece should this be required for cleaning.

As best shown in Fig. 1 perches 18 are provided extending from front to rear of the cage and a feeding perch may also be provided adjacent holes or apertures 20 in the rear of the cage for grain, seed, water and so on as will be explained in greater detail below. Further if desired a receptacle 21 may be provided for greenstuffs the front thereof being formed in the manner of a perch.

A nesting box 22 may be provided on the rear of the cage with a comparatively small entry 23 from the cage proper and a perch 24 may be provided adjacent thereto as shown.

The entry aperture 23 may be adapted to be covered by a pivoted flap 23a whereby the birds may be kept inside the nesting box while the cage is being cleaned.

Located to the rear of the cage are containers 25 for feeding stuffs, grit etc., the two larger containers shown being, for example, suitable for oats and for seed respectively and a further smaller container 26 may be provided for grit. Each of these containers may be arranged as shown in Fig. 4, having a hinged lid 27 for filling purposes, a curved U-shaped metal filter 28 and an inclined baffle 29, which may be adjustable if desired so that grain and so on filled into the container takes a natural level to the left hand side (of Fig. 4) in front of the base of the baffle 29 and at a level convenient for access by the birds on the feeding perch 19 through the apertures 20 in the rear of the cage. Preferably and as best seen in Fig. 3 an inclined baffle 30 is provided adjacent the perch 19 and running from below the apertures 20 so as to deflect spilled grain and so on, clear of the frame supports carrying the upper part of the cage while allowing them to fall through on to the tray 13.

A water container 31, best seen in Fig. 3 is also provided which embodies a water inflow pipe 32 and a level-determining overflow 33 so that with a constant supply of water a fresh supply is always maintained in the container 31 ready for use by the birds.

The green vegetable container 21 is also shown in Fig. 3 and it will be seen that an upper and a lower door 34, 35 is provided for inserting fresh green stuff and for removing residue when not required by the birds.

Figure 5:
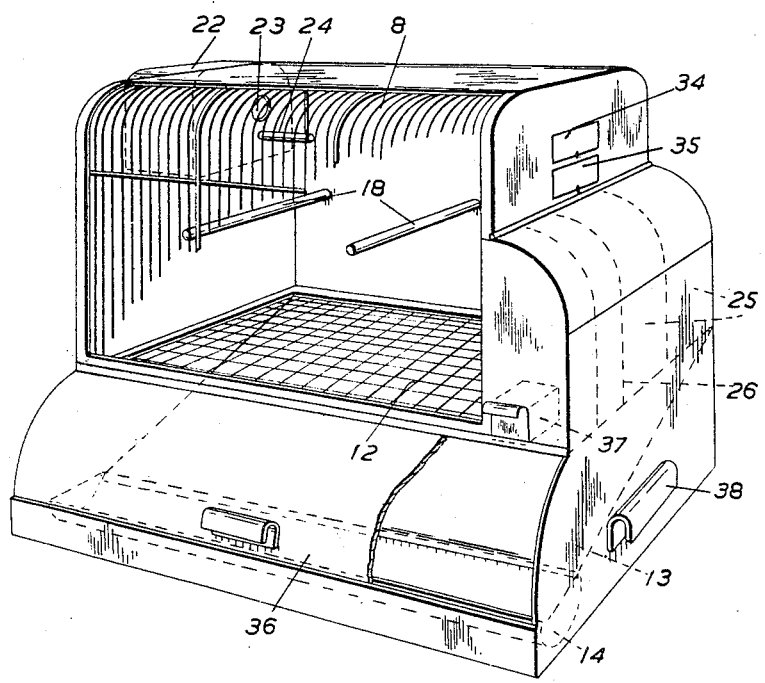

The gap between the floor 12 and the lower part of the baffle 13 may be closed by a hinged or removable cover similar to Fig. 5.

Fig. 5 illustrates a smaller form of the breeder or cage according to the present invention, suitable for example for home use, wherein the cage proper 7 is provided with a removable wire netting or mesh floor 12 as in Figs. 1 to 4 with an inclined baffle 13 beneath it together with the trough 14. These lower parts of the device are however enclosed by the base portion of the cage in the form of a housing provided with a pivoted cover 36 preferably pivoted along its upper edge so that access to the closed lower part of the cage can be readily obtained. The housing also includes separate containers 25, 26, for example in like manner in Figs. 1 to 4 while the water container 37 comprises a withdrawable tray. A nesting box 22 may be provided to one side of the cage as indicated, having a comparatively small access hole 23 for the birds in the usual manner. As shown a perch 24 may be provided adjacent this hole while other perches 18 may be provided in any suitable or convenient arrangement. Further doors 34, 35 may be provided for access to a green-stuff trough which can be arranged somewhat as in Figs. 1 to 3; carrying handles 38 may be provided for transporting the whole cage.

An advantage arising out of the above breeder with the baffle and a main container for water is that because the baffle removes refuse from the immediate vicinity of the birds, the food and grit receptacles and the main container may be of a comparatively large capacity and the breeder can be left unattended for long periods.

Breeders in accordance with Figs. 1 to 4 may be used singly for example in the home, or in batteries—one breeder to a tier or a number of breeders side by side per tier. The breeder when used in batteries may be supported by the frames 6; a single frame may serve for several breeders or separate frames may be fixed together.

What I claim is:

1. A breeder cage for birds comprising an enclosure to provide a space for occupation by birds, the front wall of said enclosure being of openwork construction, with a closed rear wall, end walls and top member, a floor for said enclosure formed of reticulated construction of small mesh, containers for substance to be taken by the birds carried by the walls of said enclosure, a collecting trough provided with an inverted U-shaped part for removably mounting said trough beneath and spaced from one wall of said enclosure, a support means under the opposite wall of said enclosure and at a higher elevation than said trough, and a tray having flange means on one edge thereof cooperative with said support means and removably supporting said tray at said one edge with said tray inclined downward and with the opposite edge of said tray removably resting on the inner edge of said trough whereby to receive material passing through the floor of the enclosure and discharge it into said collecting trough.

2. A breeder cage for birds comprising an enclosure to provide a space for occupation by birds, the front wall of said enclosure being of openwork construction, with a closed rear wall, end walls and top member, a floor for said enclosure formed of reticulated construction of small mesh, containers for substance to be taken by the birds carried by the walls of said enclosure, a collecting trough removably mounted beneath and spaced from one wall of said enclosure, support means under the opposite wall of said enclosure and at a higher elevation than said trough, a tray having means on one edge cooperative with said support means and removably supporting said tray at said one edge with said tray inclined down to and with the opposite edge of said tray removably resting on the inner edge of said trough whereby to receive material passing through the floor of the enclosure and discharge it into said collecting trough, said cage being made of a size suitable to rest on a table-like support, a housing enclosing the lower part of said cage, and a cover pivoted on said housing and permitting access to the inclined tray and to the collecting trough.

3. A breeder cage for birds comprising an enclosure to provide a space for occupation by birds, the front wall of said enclosure being of openwork construction, with a closed rear wall, end walls and top member, a floor for said enclosure formed of reticulated construction of small mesh, containers for substance to be taken by the birds carried by the walls of said enclosure, a collecting trough removably mounted beneath and spaced from one wall of said enclosure, support means under the opposite wall of said enclosure and at a higher elevation than said trough, and a tray having means on one edge cooperative with said support means and removably supporting said tray at said one edge with said tray inclined down to and with the opposite edge of said tray removably resting on the inner edge of said trough whereby to receive material passing through the floor of the enclosure and discharge it into said collecting trough, a housing enclosing the lower part of said cage, and a cover pivoted on said housing and permitting access to the inclined tray and to the collecting trough, said housing being carried upwardly to cover the containers for substances to be taken by the birds and also to provide an enclosure for a slidable tray for supplying fresh water for the birds.

References Cited in the file of this patent

UNITED STATES PATENTS

| Number | Name | Date |
|---|---|---|
| 1,410,632 | Welch | Mar. 28, 1922 |
| 1,540,393 | Haack | June 2, 1925 |
| 1,719,104 | Dolan | July 2, 1929 |
| 1,764,151 | Cosper | June 17, 1930 |
| 1,825,557 | Stoner | Sept. 29, 1931 |
| 1,843,138 | Markey | Feb. 2, 1932 |
| 1,874,708 | Palubiak | Aug. 30, 1932 |
| 1,927,416 | Petry | Sept. 19, 1933 |
| 2,031,874 | Butler et al. | Feb. 25, 1936 |
| 2,275,914 | Lorenz | Mar. 10, 1942 |
| 2,303,615 | Cobb et al. | Dec. 1, 1942 |
| 2,514,491 | Hay et al. | July 11, 1950 |
| 2,524,229 | Krueger | Oct. 3, 1950 |
| 2,532,726 | Lajoie et al. | Dec. 5, 1950 |